(12) United States Patent
Momtahan et al.

(10) Patent No.: US 11,280,714 B2
(45) Date of Patent: Mar. 22, 2022

(54) PARTICULATE MATTER VELOCITY MEASUREMENT AND SIZE ESTIMATION USING PARALLEL SELF-MIXING SENSING

(71) Applicant: Apple Inc., Cupertino, CA (US)

(72) Inventors: Omid Momtahan, Palo Alto, CA (US); Mehmet Mutlu, Stanford, CA (US); Miaolei Yan, Santa Clara, CA (US); Richard Yeh, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 104 days.

(21) Appl. No.: 16/547,466

(22) Filed: Aug. 21, 2019

(65) Prior Publication Data

US 2020/0064249 A1 Feb. 27, 2020

Related U.S. Application Data

(60) Provisional application No. 62/720,862, filed on Aug. 21, 2018.

(51) Int. Cl.
*G01N 15/02* (2006.01)
*G01N 15/14* (2006.01)

(52) U.S. Cl.
CPC ..... *G01N 15/0211* (2013.01); *G01N 15/1434* (2013.01); *G01N 2015/0222* (2013.01); *G01N 2015/1445* (2013.01)

(58) Field of Classification Search
CPC ........... G01N 15/0211; G01N 15/1434; G01N 2015/1445; G01N 2015/0222; G01N 2015/0046; G01N 15/1456; G01N 2015/1075; G01N 2015/1454
See application file for complete search history.

(56) References Cited

U.S. PATENT DOCUMENTS

| 2011/0064110 A1* | 3/2011 | Gerlach | ................ H01S 5/0264 372/50.21 |
| 2019/0285537 A1* | 9/2019 | Spruit | ................ G01N 15/1434 |
| 2020/0056972 A1* | 2/2020 | Jatekos | ................... G01S 17/95 |

* cited by examiner

*Primary Examiner* — Hwa Andrew Lee
(74) *Attorney, Agent, or Firm* — Morgan, Lewis & Bockius LLP (57) ABSTRACT

An apparatus for particulate matter (PM) measurement includes a first light source to generate a first light beam and a second light source disposed at a first distance from the first light source to generate a second light beam in parallel to the first light beam to illuminate a PM. The apparatus further includes a first light detector to measure a first timing corresponding to a first self-mixing signal resulting from a reflection and/or back-scattering of the first light beam from a PM, and a second light detector to measure a second timing corresponding to a second self-mixing signal resulting from a reflection and/or back-scattering of the second light beam from the PM. A processor can determine a first velocity of the PM based on a spatial separation between centers of the first light beam and the second light beam and a temporal separation between the first timing and the second timing.

20 Claims, 8 Drawing Sheets

PARTICULATE MATTER VELOCITY MEASUREMENT AND SIZE ESTIMATION USING PARALLEL SELF-MIXING SENSING

CROSS-REFERENCES TO RELATED APPLICATIONS

This application claims priority to and the benefit of U.S. Provisional Patent Application No. 62/720,862, filed Aug. 21, 2018, which is hereby incorporated by reference in its entirety.

TECHNICAL FIELD

The present description relates generally to sensor technology, and more particularly, to a particulate matter velocity measurement and size estimation using multiple self-mixing sensors simultaneously.

BACKGROUND

Portable communication devices (e.g., smart phones and smart watches) are becoming increasingly equipped with environmental sensors such as pressure, temperature and humidity sensors, gas sensors and particulate matter (PM) sensors. For example, a pressure sensor can enable health and fitness features in a smart watch or a smart phone. A measured pressure can then be converted (e.g., by a processor) to other parameters related to pressure, for example, elevation, motion, flow or other parameters. PM sensing and measurement can be employed in environmental applications such as air quality monitoring and management. Particulate matter (PM) contains a mixture of solid particles and liquid droplets suspended in the air. According to WHO, PM is the most dominant outdoor air pollutant in the world. They have a variety of adverse health effects, such as causing respiratory and cardiovascular irritations and diseases and even cancer. Smaller particles in particular, such as PM10 (less than 10 µm in aerodynamic diameter) and PM2.5 (less than 2.5 µm in aerodynamic diameter), can penetrate deeper into the respiratory system and even the blood streams, and are most harmful to the population.

One of the technologies that can be used in PM sensing applications is self-mixing interferometry, which leverages interference of coherent or partially coherent light reflected and/or back-scattered from an external target into the resonant optical cavity, e.g. a laser that emits the coherent or partially coherent light. The reflected and/or back-scattered light, upon re-entering the laser active region (resonant cavity) can coherently interact with the light that exists within the resonant cavity and affect the lasing process. This coherent interaction can result in a measurable change in the cavity steady-state electric field and carrier distribution that is sensitive to the phase of the reflected and/or backscattered light. As a result of their phase-sensitive nature, these changes occur periodically for every half-a-wavelength displacement of the target along the propagation direction of light, and can modulate, for example, the carrier (e.g., electrons and holes) profile, laser junction voltage, lasing frequency and laser output power.

A self-mixing signal can be detected by monitoring the junction voltage of the laser (e.g., for laser sources driven at constant current) or the bias current of the laser (e.g., for laser sources driven at constant voltage). Another option, which utilizes the changes in the laser output power, is to place a photo-detector (PD) adjacent to a laser source such as a vertical-cavity surface-emitting laser (VCSEL) or bond the VCSEL directly on top of a PD. The PD can also be an intra- or extra-cavity device monolithically integrated with the VCSEL. When the target moves at a velocity v, the reflected and/or backscattered light experiences a well-understood shift in frequency (i.e., Doppler shift). This shift in frequency (or wavelength) can be measured by performing a spectrum analysis, e.g., fast Fourier transform (FFT), of the self-mixing signal. The frequency of the fundamental beat ($f_B$) in the frequency spectrum is proportional to the wavelength shift. For example, at a velocity v=1 mm/sec along the propagation direction of light, the wavelength shift ($\Delta\lambda$) is about $6.3\times10^{-9}$ nm for a laser emitting coherent radiation of a wavelength of 940 nm and $f_B$ can be about 2.13 KHz.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in a block diagram form in order to avoid obscuring the concepts of the subject technology.

The subject technology is directed to an apparatus for measuring a velocity of a particulate matter (PM) and simultaneously, estimating the size of the interrogated PM. In one or more implementations, the apparatus of the subject technology includes a first module including a first and a second light source and a first and a second light detector. The first light source generates a first light beam, and the second light source is disposed at a first distance from the first light source and can generate a second light beam in parallel to the first light beam. The first light detector can measure a first timing corresponding to a first self-mixing signal resulting from a reflection and/or back-scattering of the first light beam from a PM, and the second light detector can measure a second timing corresponding to a second self-mixing signal resulting from a reflection of the second light beam from the PM. The first and the second timing can be defined as the first instant at which the first and second self-mixing signals corresponding to the particle exceeded the noise-floor of the system, although other definitions for the first and the second timing may be applicable as well. A processor, for example, a processor of a host device (e.g., a smart phone or a smart watch) determines a velocity of the PM along the vector that connects the centers (focal points) of the first light beam and the second light beam, based on a spatial separation between centers of the first light beam and the second light beam and a temporal separation between the first timing and the second timing.

In one or more implementations, the apparatus further includes a second module similar to the first module. The second module includes a third and a fourth light source and a third and a fourth light detector. The light beams of the third light source and the fourth light source are arranged to be in a plane perpendicular to a plane of the first light beam and the second light beam. The third and the fourth light detectors, respectively, measure a third and a fourth timing corresponding to a third and a fourth self-mixing signal resulting from reflections and/or back-scattering of the light beams of the third and fourth light sources from the PM. Further, the processor can determine a velocity of the PM along the vector that connects the centers (focal points) of the third light beam and the fourth light beam, based on a spatial separation between centers of the third light beam and the fourth light beam and a temporal separation between the third timing and the fourth timing. In this embodiment, it is targeted that the measured component of the velocity vector measured by the first and second light sources is orthogonal to the one measured by the third and fourth light sources.

In some implementations, the first and second modules can be reconfigured to measure other velocity components of the PM and in addition, simultaneously estimate a size of the PM, as described in more detail herein. The PM velocity measurement and size estimation feature of the subject technology can be deployed in hand-held communication devices, for example, smart phones and smart watches. In particular, with the miniature size of the VCSEL and photo-detectors (PDs) such an integration is practical and can be valuable for environmental applications such as air quality monitoring and management. Leveraging self-mixing interference has already been proposed for characterization of movement of a watch crown, as described respectively, in U.S. Provisional Patent Application No. 62/657,531 filed Apr. 13, 2018, which are incorporated by reference herein.

FIGS. 1A through 1D are diagrams illustrating a parallel self-mixing sensing system 100A for measuring particulate matter (PM) velocity components and corresponding self-mixing signals, in accordance with one or more aspects of the subject technology. The parallel self-mixing (SM) sensing system (hereinafter, "SM sensing system 100A") includes a first SM module 101. The first SM module 101 includes a first light source and light detector unit 102, a first optical element (e.g., lens) 106, a second light source and detector unit 104 and a second optical element (e.g., lens) 108. The first light source and light detector unit 102 can be a monolithically integrated unit including a first light source and a first photo-detector (PD). In some implementations, the first light source is a laser source such as a first vertical-cavity surface-emitting laser (VCSEL), and the first PD is an intra- or extra-cavity photodiode monolithically with the first VCSEL. Similarly, the second light source and detector unit 104 can be a monolithically integrated unit including a second light source such as a second VCSEL and a second PD (e.g., a photo-diode) integrated similarly with the second VCSEL.

Figure 1A:
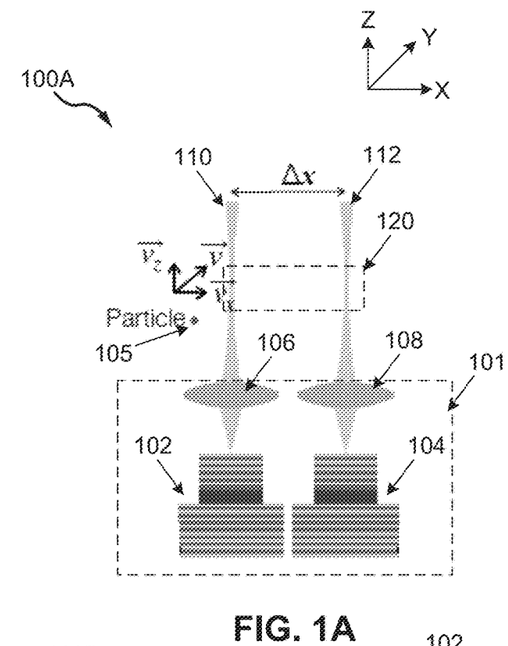
FIGS. 1A, 1B, 1C and 1D are diagrams illustrating a parallel self-mixing sensing system for measuring particulate matter (PM) velocity components and corresponding self-mixing signals, in accordance with one or more aspects of the subject technology.

The first VCSEL generates the first light beam 110, and the second VCSEL generates a second light beam 112. A center-point, defined as the point with highest irradiance on the transverse plane where the laser beam has the smallest footprint, i.e., the focal point, of the first light beam 110 is at a distance $\Delta X$ from a center-point of the second light beam 112. The value of the distance $\Delta X$ can be within a range of about 15 µm to 100 µm when two VCSELs are used. However, in the Laguerre-Gaussian implementation, $\Delta X$ would be within a range of about 0.25 µm to 2.5 µm. A focal region 120 includes focal points of the first light beam 110 and the second light beam 112. A particulate matter (PM) 105 moving in the focal region 120 can be characterized by the SM sensing system 100A. For example, when the PM 105 passes through one of the first light beam 110 or the second light beam 112, an absolute value of the respective velocity in the Z direction ($|V_z|$) can be measured from the Doppler shift by spectrally analyzing, e.g., using a fast Fourier transform (FFT), the self-mixing signal. For example, when the PM 105 is passing near the focal point of the first light beam 110, it can reflect and/or scatter part of the first light beam 110, a portion of which can reach and recouple into the resonant cavity of the first VCSEL. Upon this coherent interaction, the first PD can detect a first SM signal and measure a first timing associated with the first signal.

As the PM 105 moves in the focal region 120, it may pass near a focal point of the second light beam 112, it can reflect and/or scatter part of the second light beam 112, a portion of which can reach and recouple into the resonant cavity of the second VCSEL. Upon this coherent interaction, the second PD can detect a second SM signal and measure a second timing associated with the second signal. The time difference $\Delta T$ between the first timing (T0) and the second timing (T1) can be used (e.g., by a processor) to determine a horizontal velocity component ($V_x$) of the PM 105 by simply dividing the distance traveled ($\Delta X$) by the PM 105 in X direction to the time difference $\Delta T$ ($V_x = \Delta X/\Delta T$). The processor can be, for example, a processor of a host device such as a smart phone or a smart watch.

In one or more implementations, the first and second PDs can be separate from the first and second VCSELs and be positioned by the side of the VSCELs, for example, be implemented as side PDs on the chip. In these implementations, a cover glass and/or a separate beam-splitting element, e.g., with a beam splitting ratio of about 33:67, can be used to reflect the first and second light beams 110 and 112 to the side PDs, whose main purpose is to monitor optical power levels of the reflected and/or back-scattered lights. The power levels of the light reflected from the cover glass and/or the separate beam splitting element is a measure of the optical output power levels of the first and second VCSELs. SM interference induced by the PM 105 perturbs the output power of the VCSELs and therefore, results in a measurable signal on the corresponding PDs.

Figure 1B:
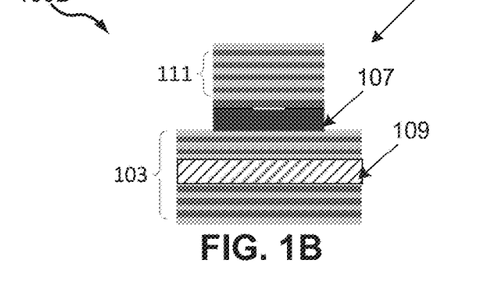

A cross sectional view 100B of structure of a light source and detector unit (e.g., 102) is shown in FIG. 1B. In one or more implementations, as shown in FIG. 1B, the light source and detector unit 102 (or 104) is a monolithic VCSEL-PD unit and includes a top distributed brag reflector (DBR) 111, a multi-quantum well active region 107 and a bottom DBR 103. The bottom DBR 103 can include an intra-cavity PD layer 109.

Figure 1C:
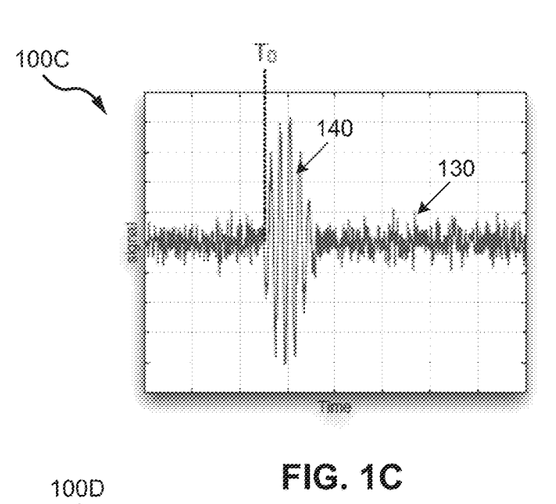

The chart 100C, shown in FIG. 1C, represents a signal registered by the first PD of the first light source and detector unit 102. The registered signal includes a background (e.g., noise) 130 and a first SM signal 140. The first timing T0 is a starting time of the first SM. Alternatively, T0 can be defined as the peak point of the envelope of the SM signal 140.

Figure 1D:
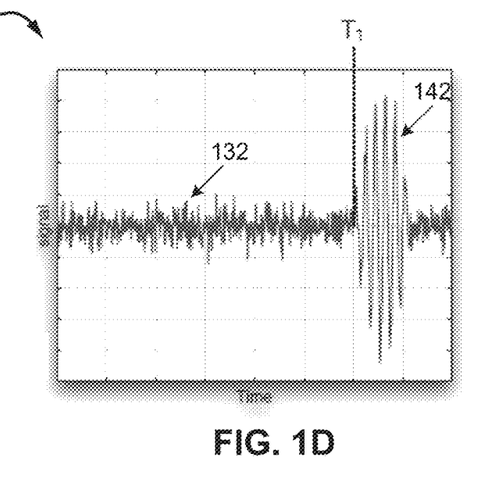

The chart 100D, shown in FIG. 1D, represents a signal registered by the second PD of the second light source and detector unit 104. The registered signal in this case includes a background (e.g., noise) 132 and a second SM signal 142. The second timing T1 is a starting time of the second SM signal 142. Alternatively, T1 can be defined as the peak point of the envelope of the SM signal 142. As described above, the time difference $\Delta T=T1-T0$ can be used to fully determine a value of a velocity $V_x$ of the PM 105 along the X axis. In addition, the direction of the PM 105 motion along the X axis, i.e., positive or negative, can be determined by comparing T0 to T1.

Figure 1E:
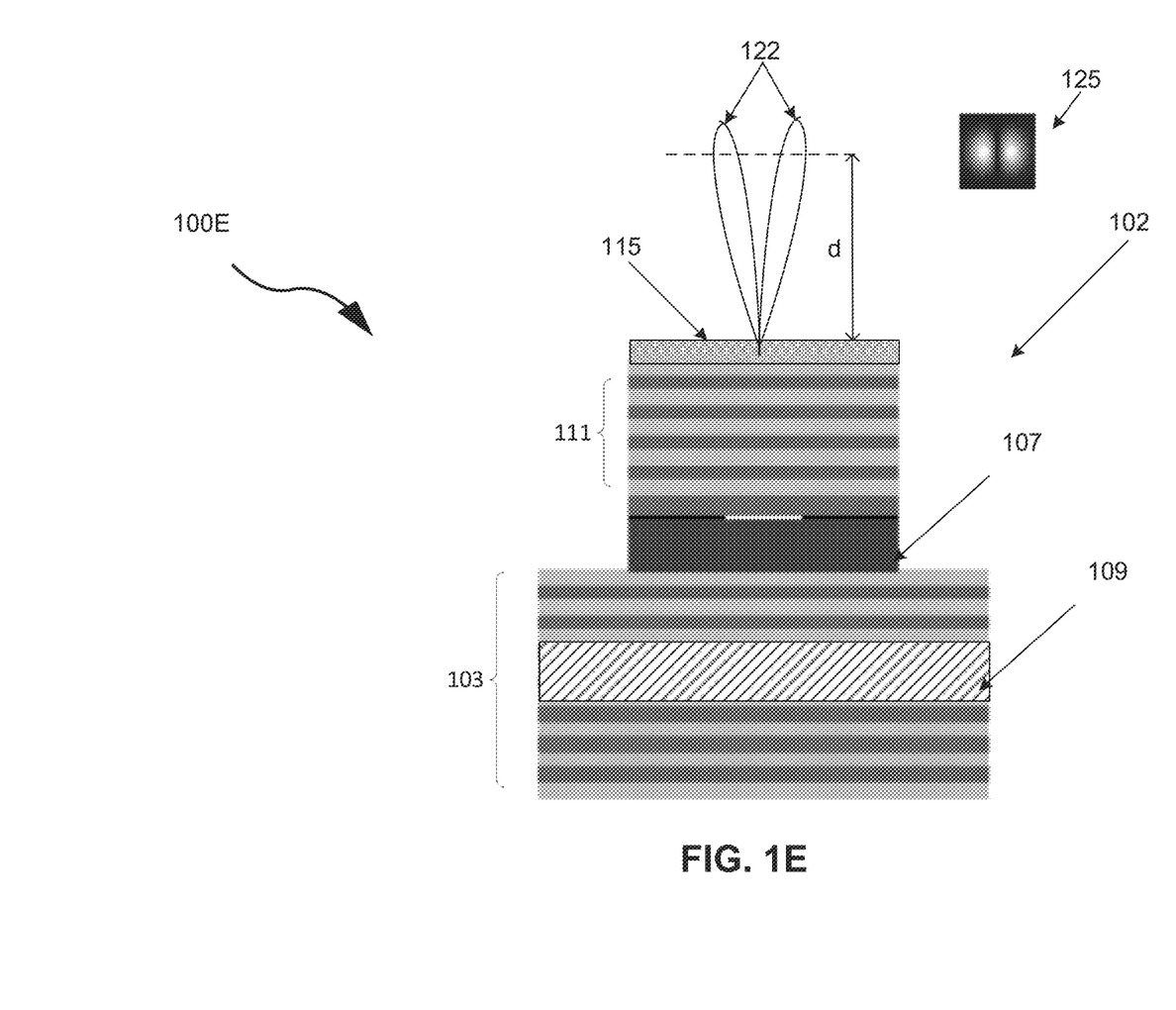
FIG. 1E is a diagram illustrating a parallel self-mixing sensing system for measuring PM velocity components and corresponding self-mixing signals using a single light source, in accordance with one or more aspects of the subject technology.

FIG. 1E is a diagram illustrating a parallel self-mixing sensing system 100E for measuring PM velocity components and corresponding self-mixing signals using a single light source, in accordance with one or more aspects of the subject technology. In some implementations, the first and the second light beams (110 and 112 of FIG. 1A) can be realized based on a single laser source (e.g., first VCSEL), as shown in FIG. 1E. The parallel self-mixing sensing system 100E is similar to the system shown in FIG. 1B and discussed above, except for the addition of a holographic plate 115. In these implementations, the single beam of the single laser source can be converted into a higher order Laguerre-Gaussian beam having two separate lobes 122, for example, by means of using the holographic plate 115. Each lobe of the lobes 122 realizes one of the first and the second light beams 110 and 112 and can be used similarly to characterize the PM 105, as described above. In this implementation, the SM signal can be read from a single PD. A cross-sectional view 125 of the lobes 122 at a distance d from the holographic plate 115 is similar to the cross-sectional view of the first and the second light beams 110 and 112.

Figure 2:
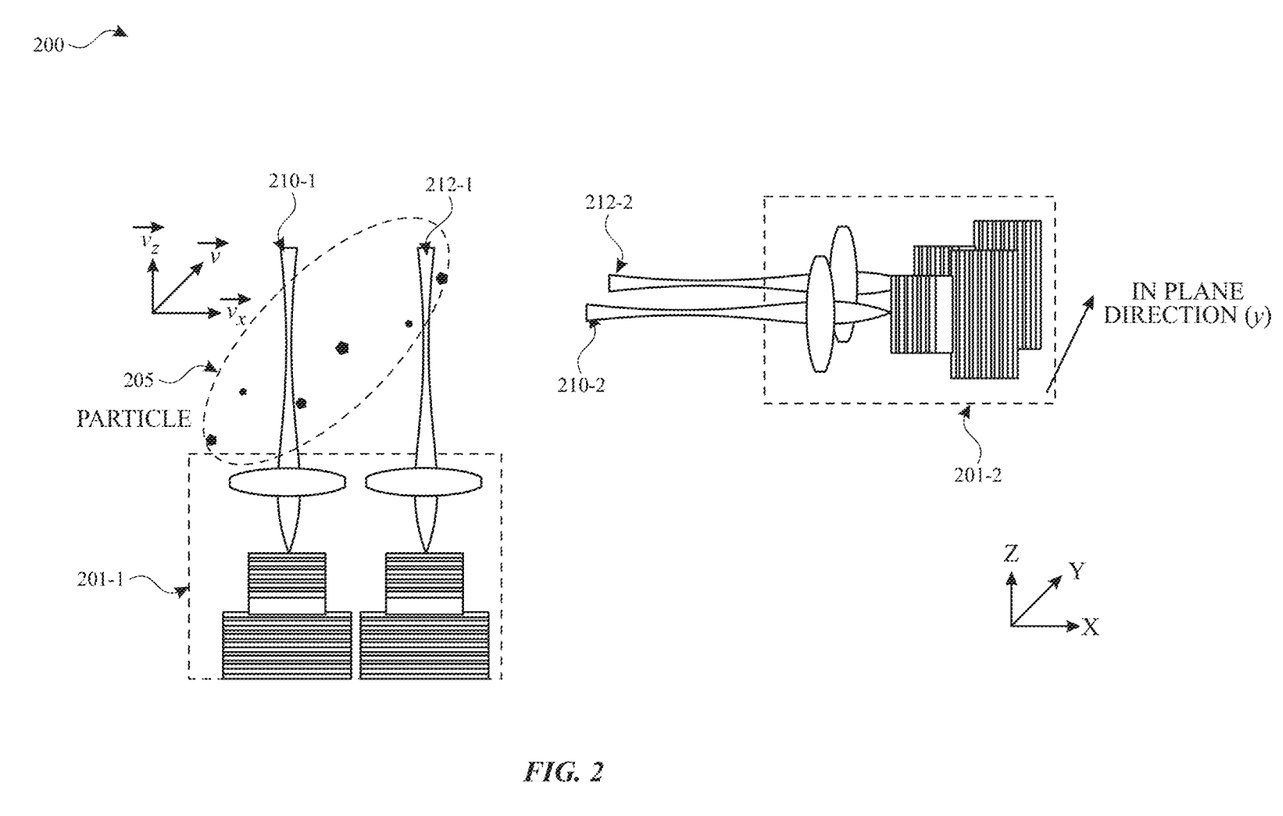
FIG. 2 is a diagram illustrating a parallel self-mixing sensing system for measuring additional PM velocity components, in accordance with one or more aspects of the subject technology.

FIG. 2 is a diagram illustrating a parallel SM sensing system 200 for measuring additional PM velocity components, in accordance with one or more aspects of the subject technology. The parallel SM sensing system (hereinafter, "SM sensing system") 200 includes a first SM module 201-1 and a second SM module 201-2. The first SM module 201-1 can be structurally and functionally similar to or distinct from SM module 101 of FIG. 1 and generates focused light beams designated as a first light beam 210-1 and a second first light beam 212-1. The second SM module 201-2 is also structurally and functionally similar to the SM module 101 of FIG. 1 and generates focused third light beam 210-2 and fourth light beam 212-2.

In the embodiment shown in FIG. 2, the second SM module 201-2 is positioned such that the third light beam 210-2 and fourth light beam 212-2 are in the −X direction. In some implementations, the second SM module 201-2 can be realized on the same plane (e.g., same planar substrate) with the first SM module 201-1, while a mirror (metallic, thin film, diffractive, or based on total internal reflection) can be used to tilt the corresponding light beams to create the third light beam 210-2 and fourth line beam 212-2 in the −X direction, as shown in FIG. 2.

Also shown in FIG. 2 are several representative PM 2.5, the particles of which can move in between the focal regions of the first SM module 201-1 and the second SM module 201-2. The SM sensing system 200 is capable of unambiguously determining the velocity components $V_x$ and $V_y$ and determining $V_z$ with a sing ambiguity. For example, as described above with respect to FIG. 1A, by measuring the Doppler shift contained in the SM signal, an absolute value of a velocity component in the Z direction ($|V_z|$) can be measured by the first SM module 201-1, and an absolute value of a velocity component in the X direction ($|V_x|$) can be measured similarly by the second SM module 201-2. Further, by comparing the first and second timings T0 and T1, the first SM module 201-1 can measure a value of a velocity component Vx, and similarly, the SM module 201-2 can measure a value of a velocity component Vy. Accordingly, the SM sensing module 200 can fully measure particle velocity components Vx and Vy and measure an absolute value of the Vz component ($|Vz|$). Since x, y, and z axes for an orthogonal basis for the three dimensional space, this information is sufficient to unambiguously determine the speed of PM 105.

Figure 3:
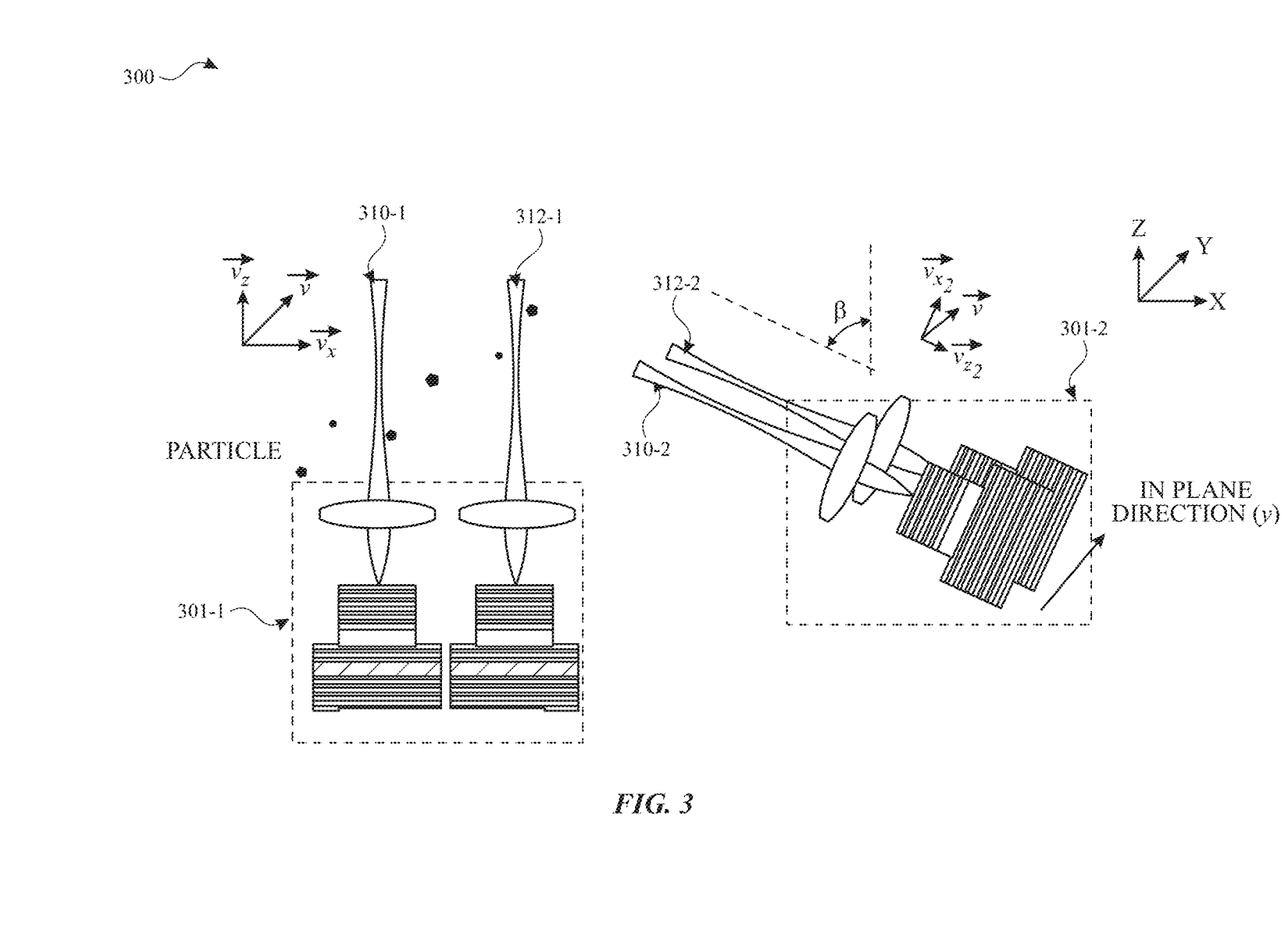
FIG. 3 is a diagram illustrating a parallel self-mixing sensing system for measuring additional PM velocity components, in accordance with one or more aspects of the subject technology.

FIG. 3 is a diagram illustrating a parallel self-mixing sensing system 300 for measuring additional PM velocity components, in accordance with one or more aspects of the subject technology. The parallel SM sensing system (hereinafter, "SM sensing system") 300 includes a first SM module 301-1 and a second SM module 301-2. The first SM module 301-1 is structurally and functionally similar to the SM module 101 of FIG. 1 and generates focused first and second light beams 310-1 and 312-1. The second SM module 301-2 can be structurally and functionally similar to or distinct from the SM module 101 of FIG. 1 and generates focused third and fourth light beams 310-2 and 312-2.

In the embodiment shown in FIG. 3, the second SM module 301-2 is positioned on a plane, which is at an acute angle β with respect to the plane of first SM module 301-1, such that the third and fourth light beams 310-2 and 312-2 are in a direction at an angle β with respect to the direction of the first and second light beams 310-1 and 312-1. In some implementations, the second SM module 301-2 can be realized on the same plane (e.g., same planar substrate) with the first SM module 301-1. For these implementations, a suitable optical tilting element (e.g., a metallic, thin film, diffractive, or total internal reflection based mirror) can be used to tilt the corresponding light beams to create the third and fourth light beams 310-2 and 312-2 in the direction at the angle β with respect to the direction of the first and second light beams 310-1 and 312-1, as shown in FIG. 3.

The SM sensing system 300 is capable of determining all three velocity components of a particle without any direction ambiguity. For example, as described above with respect to FIG. 1A, by measuring the Doppler shift contained in the SM signal an absolute value of a velocity component in the Z direction ($|V_z|$) can be measured by the first SM module 301-1, and an absolute value of the velocity component in the Z2 direction ($|V_{z2}|$) can be measured by the second SM module 301-2. Further, by comparing the corresponding first and second timings T0 and T1, the first SM module 301-1 can measure a value of a velocity component $V_x$, and similarly, the SM module 301-2 can measure a value of a velocity component in the Y direction (Vy). Knowing the direction of $V_x$, the direction of the velocity $V_{z2}$ can be determined. Further, from the direction of the velocity $V_{z2}$, one can directly find the direction of $V_z$. Thus, the SM sensing module 300 can fully measure particle velocity components $V_x$, $V_y$, and $V_z$ with no ambiguity in directions.

Figure 4A:
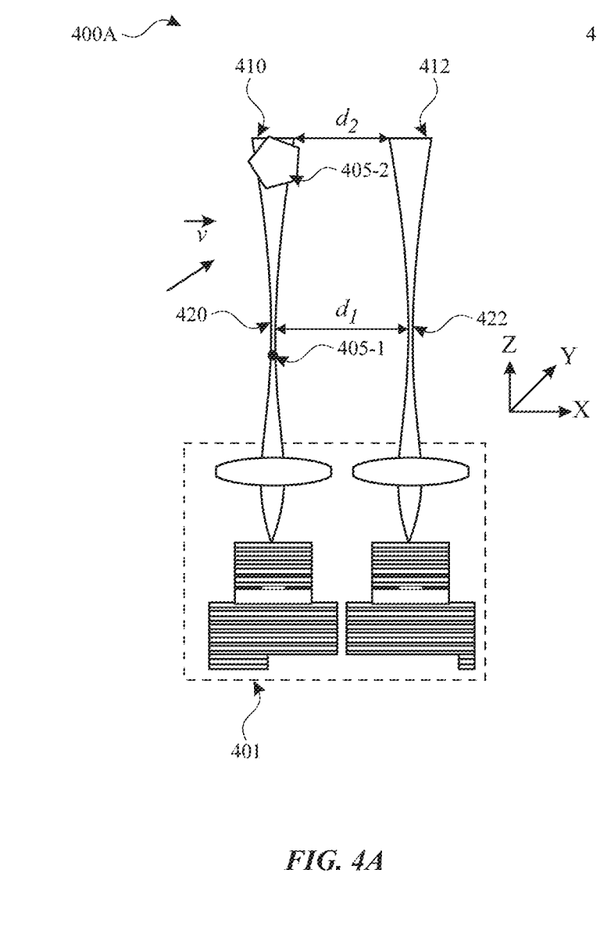
FIGS. 4A-4B are block diagrams illustrating a parallel self-mixing sensing system for estimating PM size, in accordance with one or more aspects of the subject technology.
Figure 4B:
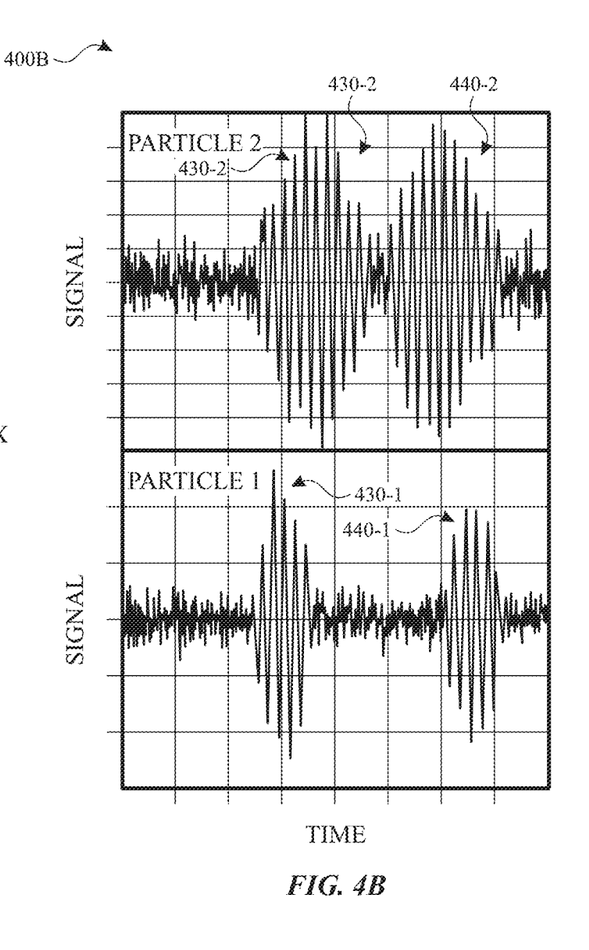

FIGS. 4A-4B are block diagrams illustrating a parallel SM sensing system 400A for estimating PM size, in accordance with one or more aspects of the subject technology. The parallel SM sensing system (hereinafter, "SM sensing system") 400A includes a SM module 401 that is structurally and functionally similar to the SM module 101 of FIG. 1A, the PM size measurement capability of this module is explained here. The SM module 401 generates two parallel light beams, a first light beam 410 and a second light beam 412. A small PM 405-1 is shown in the focal point of the first light beam 410 and a large PM 405-2 at a distance from the small PM 405-1 on the same light beam. The SM signal alone cannot distinguish the size of the particles in the first light beam 410. This is because the distances of the particles from the focal point are not known. However, as the two particles move towards the second light beam 412, the small PM 405-1 needs to travel a longer distance $d_1$ to pass through the second light beam 412 than the distance $d_2$ that the larger PM 405-2 has to travel to reach the second light beam 412. This is because the separation between the first light beam 410 and the second light beam 412 varies with distance as shown in FIG. 4A.

A chart 400B of FIG. 4B shows SM signals for the two particles. For example, SM signals 430-1 and 440-1 correspond to the small PM 405-1 and the SM signals 430-2 and 440-2 correspond to the large PM 405-2. Thus, similar to chart 100A, an estimate of the lateral speed ($V_x$) can be achieved based on the differences between the first timing (T0) and the second timing (T1). In addition, as shown in FIG. 4B with the signals 430 (e.g., 430-1 and 430-2) and 440 (e.g., 440-1 and 440-2) collected for the small PM 405-1 (particle 1) and the large PM 405-2 (particle 2), one could have some estimate of the particle size by using the time difference between the end of one signal and the start of the other one and the SM signal to noise ratio. This property could also be used to detect and to reject large scattering objects (e.g., human body, face, table, etc.) at a distance and to separate the SM signals originating from such large objects at a greater distance from the signal actually generated by PM. This separation can be based on the fact that large objects at a greater distance produce signals simultaneously in both modules whereas PM (a few microns or less in diameter) cannot produce simultaneous signals. The detection and suppression of false positives due to large scattering objects (sometimes known as far field occlusion) could help solve a significant problem with in-field PM sensor integration.

Figure 5:
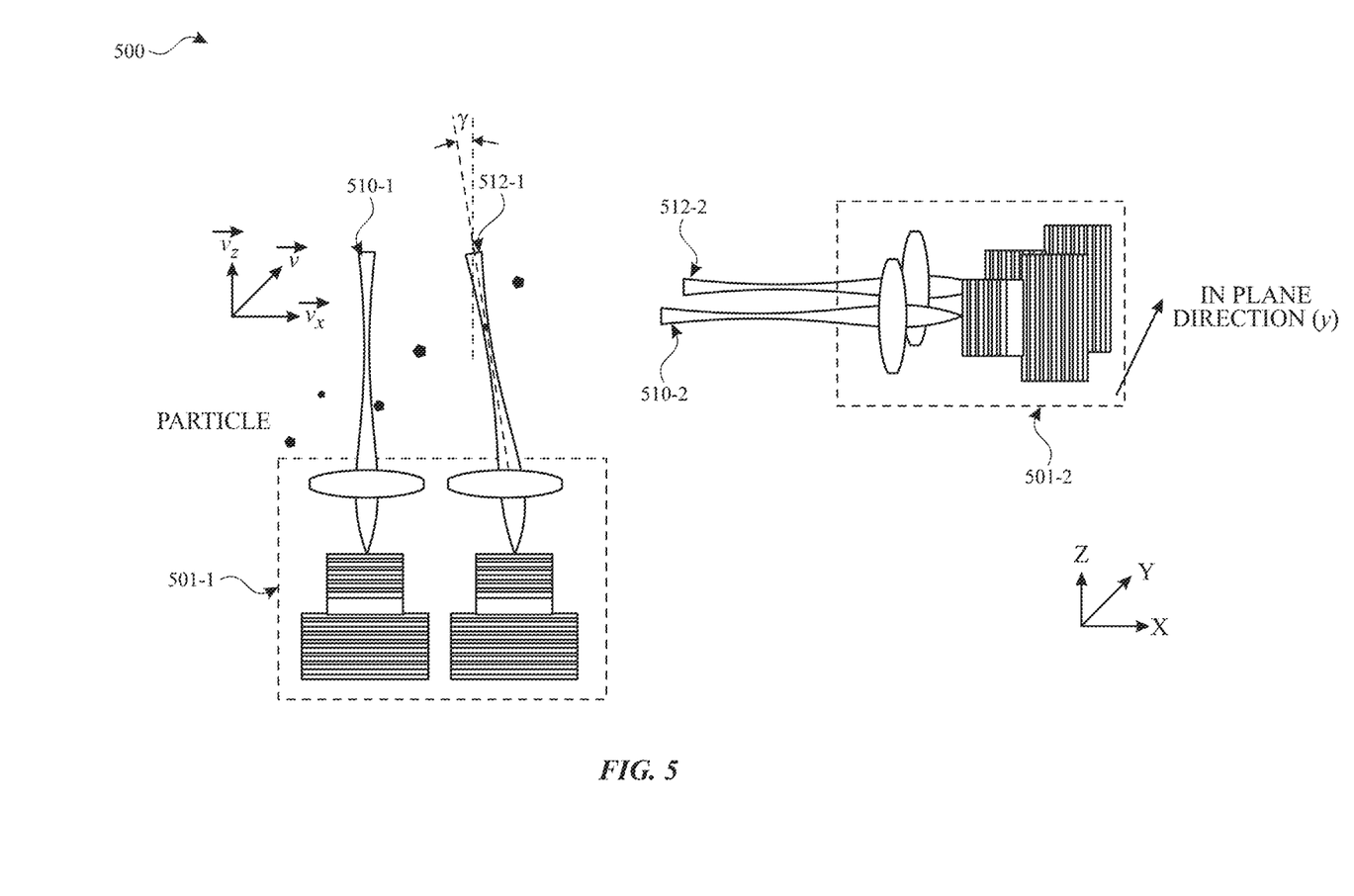
FIG. 5 is a block diagram illustrating a parallel self-mixing sensing system for measurement of PM velocity components in 3D, in accordance with one or more aspects of the subject technology.

FIG. 5 is a block diagram illustrating a parallel self-mixing sensing system 500 for measurement of PM velocity components in 3D, in accordance with one or more aspects of the subject technology. The parallel SM sensing system (hereinafter, "SM sensing system") 500 includes a first SM module 501-1 and a second SM module 501-2. The SM sensing system 500 is similar to the SM sensing system 200 of FIG. 2, except that a second light beam 512-1 of the first SM module 501-1 is not parallel with the first light beam 510-1 of the same SM module 501-1. A tilt angle (y) between the first light beam 510-1 and the second light beam 512-1 of the first SM module 501-1 can be used to estimate the distance of a detected particle from the focal point of the first light beam 510-1. In the SM sensing system 500, as described above, a particle velocity component $|V_z|$ and a sign of a particle velocity component Vx can be measured using the first SM module 501-1. In this case, $|V_z|$ would be obtained from the Doppler shift contained in the SM signal collected by monitoring the output power of the left VCSEL in module 501-1. Sign of Vx would be obtained by comparison of the first and second timing T0 and T1. Further, values of $|V_x|$ and $V_y$ (velocity component in the Y direction) can be measured by the second SM module 501-2. Again, $|V_x|$ comes from the Doppler shift contained in the SM signal $V_y$ is calculated by comparing the first and second timing T0 and T1 obtained from module 501-2. Knowing the sign and absolute value of $V_x$, the velocity component Vx is fully characterized. The known value of $V_x$ and the time difference between the signals detected in the first SM module 501-1 can be used to estimate the distance of the particle from the focus of the first SM module 501-1. For a fixed $V_x$, a shorter time difference indicates that the particle is farther away from the focus along the specified z axis.

Figure 6:
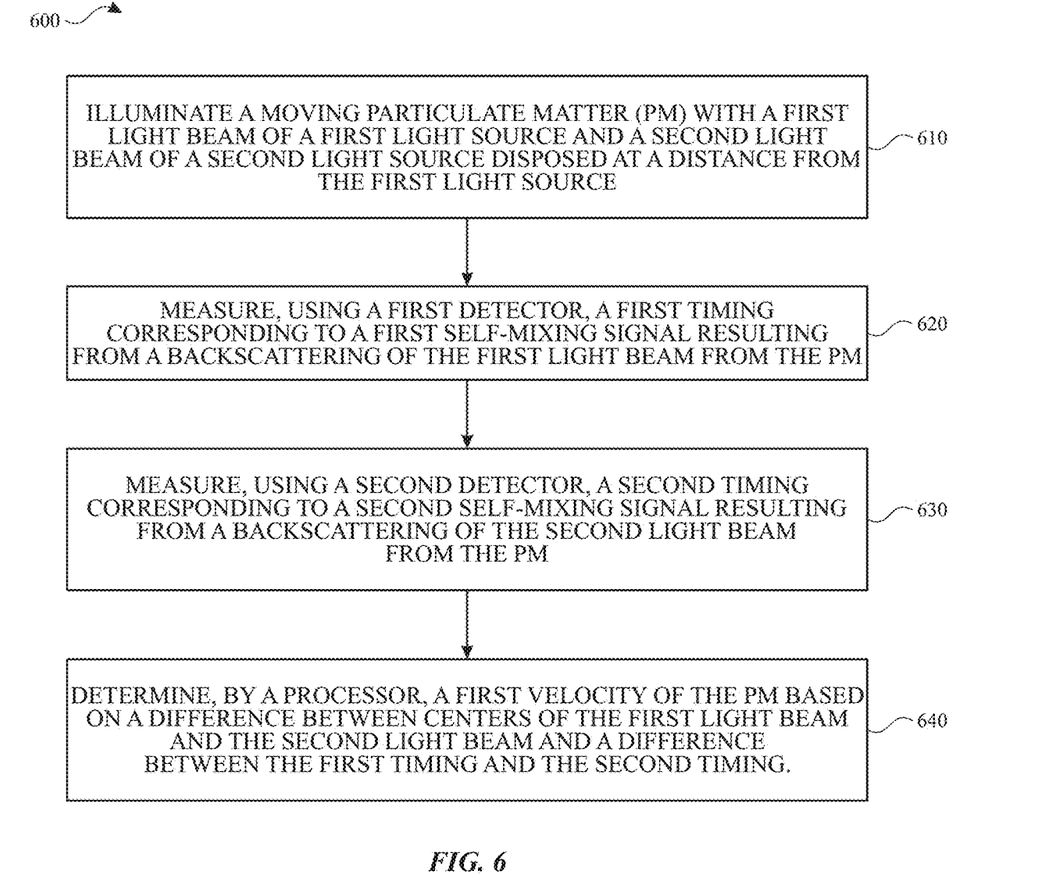
FIG. 6 are flow diagrams illustrating a method for measurement of PM velocity components based on parallel self-mixing sensing, in accordance with one or more aspects of the subject technology.

FIG. 6 are flow diagrams illustrating a method 600 for measurement of PM velocity components based on parallel self-mixing sensing (e.g., 100A of FIG. 1A), in accordance with one or more aspects of the subject technology. The method 600 includes illuminating a moving particulate matter (PM) (e.g. 105 of FIG. 1A) with a first light beam (e.g., 110 of FIG. 1A) of a first light source (e.g., 102 of FIG. 1A) and a second light beam (e.g., 112 of FIG. 1A) of a second light source (e.g., 104 of FIG. 1A), disposed at a distance from the first light source (610). The method 600 further includes measuring, using a first light detector (e.g., integrated with 102 of FIG. 1A), a first timing (e.g., T0 of FIG. 1B) corresponding to a first self-mixing signal (e.g., 140 of FIG. 1B) resulting from a reflection and/or back scattering of the first light beam from the PM (620). Using a second light detector (e.g., integrated with 104 of FIG. 1A), a second timing (e.g., T1 of FIG. 1C) corresponding to a second self-mixing signal (e.g., 142 of FIG. 1C) resulting from a reflection and/or back scattering of the second light beam from the PM is measured (630). A processor (e.g., a processor of a host device) determines a first velocity (e.g., $V_x$) of the PM based on a difference (e.g., ΔX of FIG. 1A) between centers of the first light beam and the second light beam and a difference between the first timing and the second timing (640).

Figure 7:
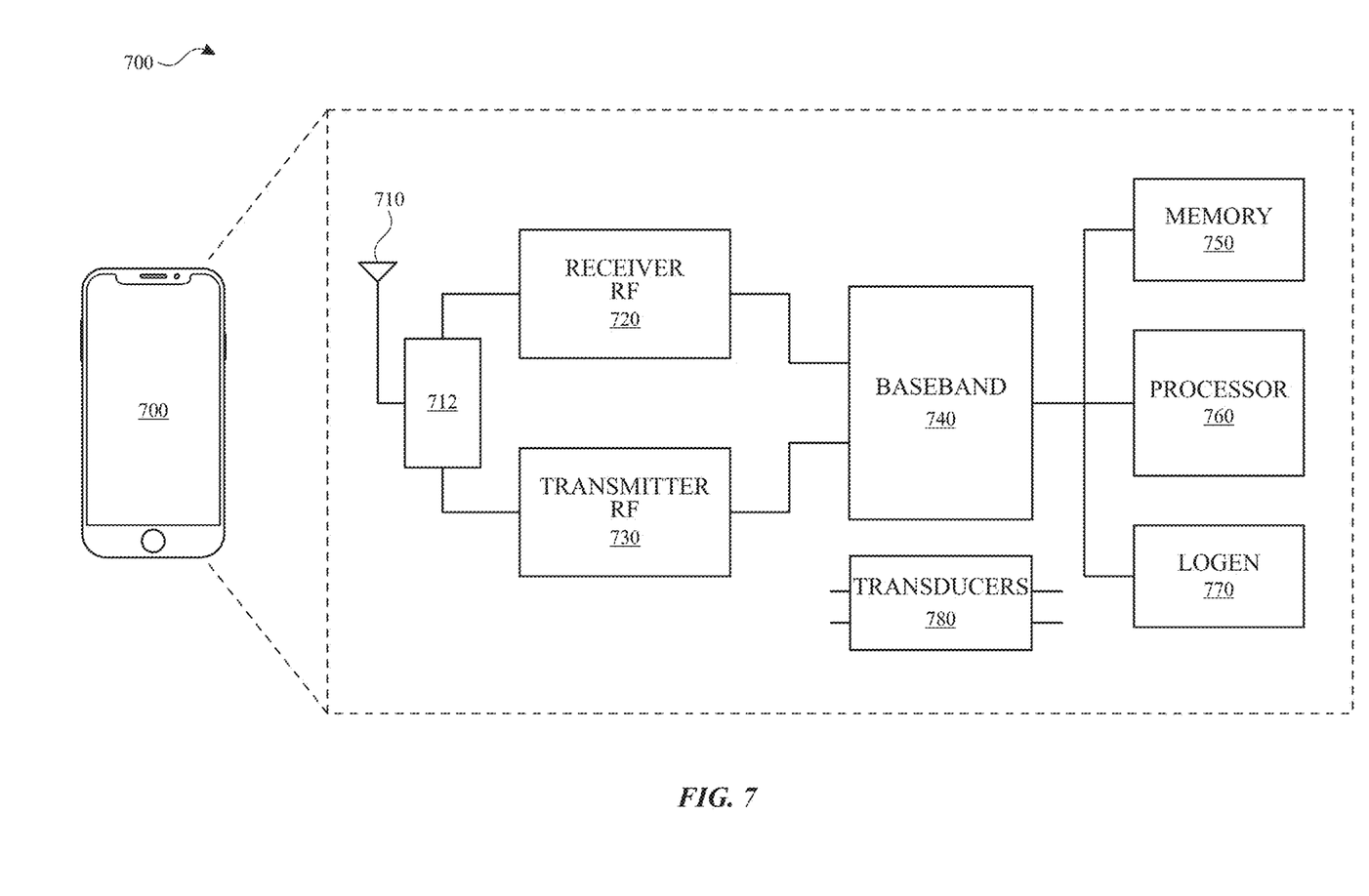
FIG. 7 is a block diagram illustrating a wireless communication device, within which one or more aspects of the subject technology can be implemented.

FIG. 7 is a block diagram illustrating a wireless communication device 700, within which one or more aspects of the subject technology can be implemented. In one or more implementations, the wireless communication device 700 can be a smart phone or a smart watch that hosts an apparatus of the subject technology for air quality monitoring. The wireless communication device 700 may comprise a radio-frequency (RF) antenna 710, a receiver 720, a transmitter 730, a baseband processing module 740, a memory 750, a processor 760, a local oscillator generator (LOGEN) 770 and one or more transducers 780. In various embodiments of the subject technology, one or more of the blocks represented in FIG. 7 may be integrated on one or more semiconductor substrates. For example, the blocks 720-770 may be realized in a single chip or a single system on a chip, or may be realized in a multi-chip chipset.

The receiver 720 may comprise suitable logic circuitry and/or code that may be operable to receive and process signals from the RF antenna 710. The receiver 720 may, for example, be operable to amplify and/or down-convert received wireless signals. In various embodiments of the subject technology, the receiver 720 may be operable to cancel noise in received signals and may be linear over a wide range of frequencies. In this manner, the receiver 720 may be suitable for receiving signals in accordance with a variety of wireless standards, Wi-Fi, WiMAX, Bluetooth, and various cellular standards. In various embodiments of the subject technology, the receiver 720 may not require any SAW filters and few or no off-chip discrete components such as large capacitors and inductors.

The transmitter 730 may comprise suitable logic circuitry and/or code that may be operable to process and transmit signals from the RF antenna 710. The transmitter 730 may, for example, be operable to up-convert baseband signals to RF signals and amplify RF signals. In various embodiments of the subject technology, the transmitter 730 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 730 may be operable to provide signals for further amplification by one or more power amplifiers.

The duplexer 712 may provide isolation in the transmit band to avoid saturation of the receiver 720 or damaging parts of the receiver 720, and to relax one or more design requirements of the receiver 720. Furthermore, the duplexer 712 may attenuate the noise in the receive band. The duplexer may be operable in multiple frequency bands of various wireless standards.

The baseband processing module 740 may comprise suitable logic, circuitry, interfaces, and/or code that may be operable to perform processing of baseband signals. The baseband processing module 740 may, for example, analyze received signals and generate control and/or feedback signals for configuring various components of the wireless communication device 700, such as the receiver 720. The baseband processing module 740 may be operable to encode, decode, transcode, modulate, demodulate, encrypt, decrypt, scramble, descramble, and/or otherwise process data in accordance with one or more wireless standards.

The processor 760 may comprise suitable logic, circuitry, and/or code that may enable processing data and/or controlling operations of the wireless communication device 700. In this regard, the processor 760 may be enabled to provide control signals to various other portions of the wireless communication device 700. The processor 760 may also control transfer of data between various portions of the wireless communication device 700. Additionally, the processor 760 may enable implementation of an operating system or otherwise execute code to manage operations of the wireless communication device 700. In one or more implementations, the processor 760 can be used to determine various PM velocities based on SM signals of the SM sensing systems of the subject technology, as described above (e.g., with respect to FIG. 1A).

The memory 750 may comprise suitable logic, circuitry, and/or code that may enable storage of various types of information such as received data, generated data, code, and/or configuration information. The memory 750 may comprise, for example, RAM, ROM, flash, and/or magnetic storage. In various embodiments of the subject technology, information stored in the memory 750 may be utilized for configuring the receiver 720 and/or the baseband processing module 740.

The local oscillator generator (LOGEN) 770 may comprise suitable logic, circuitry, interfaces, and/or code that may be operable to generate one or more oscillating signals of one or more frequencies. The LOGEN 770 may be operable to generate digital and/or analog signals. In this manner, the LOGEN 770 may be operable to generate one or more clock signals and/or sinusoidal signals. Characteristics of the oscillating signals such as the frequency and duty cycle may be determined based on one or more control signals from, for example, the processor 760 and/or the baseband processing module 740.

In operation, the processor 760 may configure the various components of the wireless communication device 700 based on a wireless standard according to which it is desired to receive signals. Wireless signals may be received via the RF antenna 710, amplified, and down-converted by the receiver 720. The baseband processing module 740 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 750, and/or information affecting and/or enabling operation of the wireless communication device 700. The baseband processing module 740 may modulate, encode, and perform other processing on audio, video, and/or control signals to be transmitted by the transmitter 730 in accordance with various wireless standards.

The one or more transducers 780 may include the miniature SM sensing system of the subject technology, for example, as shown in FIGS. 1A, 2, 3, 4A and 5 and described above. The SM sensing system (e.g., a miniature sensing system) of the subject technology can be readily integrated into the communication device 700, in particular, when the communication device 700 is a smart mobile phone or a smart watch. In one or more implementations, the processor 760 can process SM signals from the first and second SM modules of the subject technology, to determine a number of velocity components or an estimate of the size of the PM. In one or more implementations, the memory 750 can store measured velocity components and PM sizes.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to," "operable to," and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An apparatus for particulate matter (PM) spatial and temporal separation measurement, the apparatus comprising:
   a light source including a holographic plate configured to generate a first light beam and a second light beam to illuminate a PM,
   wherein the second light beam is generated at a first distance from the first light beam, and the first light beam and the second light beam are in parallel and are configured to illuminate the PM;
   a light detector configured to measure a first timing and a second timing corresponding to self-mixing signals resulting respectively from at least one of a reflection or back scattering of the first light beam and the second light beam from the PM; and
   a processor configured to determine a first velocity of the PM based on a spatial separation between centers of the first light beam and the second light beam and a temporal separation between the first timing and the second timing.

2. The apparatus of claim 1, wherein the light source comprises a laser source realized on a semiconductor chip and further comprises one or two optical elements configured to focus the first and the second light beams.

3. The apparatus of claim 2, wherein the light detector is integrated with the light source.

4. The apparatus of claim 2, wherein a single beam of a single laser source is converted into a higher order Laguerre-Gaussian beam having two separate lobes, each lobe realizing one of the first and the second light beams.

5. The apparatus of claim 1, wherein the processor is configured to determine the first velocity of the PM along a direction of a vector connecting a focal point of the first light beam to a focal point of the second light beam.

6. The apparatus of claim 1, wherein the processor is configured to estimate a size of the PM based on measured timing differences of self-mixing signals corresponding to PMs with different sizes passing through the first light beam and the second light beam at different distances from a focal point of the first light beam and the second light beam.

7. The apparatus of claim 1, wherein the processor is configured to detect far field occlusion by large scattering moving objects, and to separate far field occlusion from self-mixing signals generated by small airborne PM, wherein the separation is based on signals being produced in light detector by the large scattering moving objects being at a greater distance.

8. The apparatus of claim 1, further comprising:
   a second light source and a third light source, wherein light beams of the second light source and the third light source are arranged to be in a second plane perpendicular to a first plane of the first light beam and the second light beam, and to be perpendicular to the first light beam and the second light beam; and
   a second and a third light detector configured to respectively measure a third and a fourth timing corresponding to a third and a fourth self-mixing signal resulting from at least one of reflections or back scatterings of the light beams of the second and third light sources from the PM.

9. The apparatus of claim 8, wherein the processor is further configured to determine a second velocity of the PM in a direction perpendicular to and in a second plane of the light beams of the second light source and the third light source, and wherein the second velocity is determined based at least on a temporal separation between third and the fourth timing.

10. A communication device comprising:
    a processor; and
    a first module comprising:
      a light source including a holographic plate configured to generate a first light beam and a second light beam to illuminate a particulate matter (PM); and
      a light detector configured to respectively detect a first self-mixing signal and a second self-mixing signal resulting respectively from at least one of reflections or back scatterings of the first light beam and the second light beam from the PM, and to measure a first timing and a second timing corresponding to the first self-mixing signal and the second self-mixing signal,
      wherein the processor is configured to determine a first velocity component of the PM based at least on a temporal separation between the first timing and the second timing.

11. The communication device of claim 10, wherein the first light beam and the second light beam are generated from two separate lobes of a higher order Laguerre-Gaussian beam resulting from conversion of a single beam of a single laser source.

12. The communication device of claim 10, wherein the light detector comprises a photodiode monolithically integrated with the light source.

13. The communication device of claim 12, wherein the first light beam is parallel to the second light beam, and wherein the first velocity component of the PM is in a direction along a direction of a vector connecting a focal point of the first light beam to a focal point of the second light beam.

14. The communication device of claim 10, further comprising a second module comprising a second light source and a third light source, wherein light beams of the second light source and the third light source are arranged to be in a second plane perpendicular to a first plane of the first light beam and the second light beam.

15. The communication device of claim 14, wherein the light beams of the second light source and the third light source are arranged to be at a first angle with respect to the first light beam and the second light beam.

16. The communication device of claim 15, wherein the second module further comprises a second and a third light detector configured to respectively detect a third and a fourth self-mixing signals resulting from at least one of reflections or back scatterings of the light beams of the second and third light sources from the PM, and to measure a third and a fourth timing corresponding to the third and the fourth self-mixing signals.

17. The communication device of claim 15, wherein the first angle comprises a 90-degree angle and the second light beam is at a second angle with respect to the first light beam.

18. The communication device of claim 17, wherein the processor is further configured to determine both amplitude and direction of the first velocity component and a second velocity component of the PM based at least on a first temporal separation between the first timing and the second timing and a spatial separation between the light beams of the second light source and the third light source.

19. An apparatus comprising:

A processor;

a first self-mixing module; and a second self-mixing module having similar features as the first self-mixing module, wherein the first self-mixing module comprises:

a light source including a holographic plate configured to generate a first light beam and a second light beam to illuminate a particulate matter (PM); and a light detector configured to detect a first self-mixing signal and a second self-mixing signal resulting respectively from at least one of reflections or back scatterings of the first light beam and the second light beam from the PM, and to measure a first timing and a second timing corresponding to the first self-mixing signal and the second self-mixing signal, and wherein the processor is configured to determine more than one velocity component of the PM based at least on a first temporal separation between the first timing and the second timing and a second temporal separation between a third timing and a fourth timing associated with the second self-mixing module.

20. The apparatus of claim 19, wherein a third light beam and a fourth light beam associated with the second self-mixing module are in a second plane perpendicular to a first plane of the first light beam and the second light beam, and the third light beam and the fourth light beam are at an angle with respect to the first light beam and the second light beam.

* * * * *